US006456984B1

United States Patent
Demoff et al.

(10) Patent No.: US 6,456,984 B1
(45) Date of Patent: Sep. 24, 2002

(54) METHOD AND SYSTEM FOR PROVIDING TEMPORARY CREDIT AUTHORIZATIONS

(75) Inventors: Jeff S. Demoff, Boulder, CO (US); Brad Reeves, Berthoud, CO (US); Alan Scott Wolff, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/321,934

(22) Filed: May 28, 1999

(51) Int. Cl.[7] .............................................. G06F 17/60
(52) U.S. Cl. ............................ 705/40; 705/38; 705/39; 705/41; 705/42; 705/43; 705/44; 705/45
(58) Field of Search ............................. 705/40, 35–39, 705/41–45

(56) References Cited

U.S. PATENT DOCUMENTS

| 6,000,832 A | * | 12/1999 | Franklin et al. | ........ | 364/479.02 |
| 6,014,650 A | * | 1/2000 | Zampese | ..................... | 705/44 |
| 6,227,447 B1 | * | 5/2001 | Campisano | .................. | 235/380 |

FOREIGN PATENT DOCUMENTS

WO  WO 99/08239  *  2/1999  ............. G07F/7/10

OTHER PUBLICATIONS

Protocols for E–commerce, Dialog, The Gale Group, Dec., 1998, 3 pages.*

* cited by examiner

*Primary Examiner*—Frantzy Poinvil
*Assistant Examiner*—Richard Fults
(74) *Attorney, Agent, or Firm*—Brooks & Kushman P.C.

(57) ABSTRACT

A method and system are provided for issuing credit as payment in a consumer transaction which eliminates the need for a traditional credit card while also minimizing any potential for fraud or theft. The present invention responds to a request for issuing a credit transaction number that is made concurrent with a particular transaction. The credit transaction number is then randomly generated and made valid only for the requested transaction, and automatically ages a short period of time after the request. The credit transaction numbers are continually recycled for subsequent requests irrespective of the customer identity. The request can be made from a mobile communication device such as PCS telephone, or from a personal computer using an electronic commerce program. Transactions between customers and registered or known vendors can be automatically carried out by a centralized service provider without generating the unique, temporary number, or without the need for the customer or vendor to exchange personal information.

19 Claims, 7 Drawing Sheets

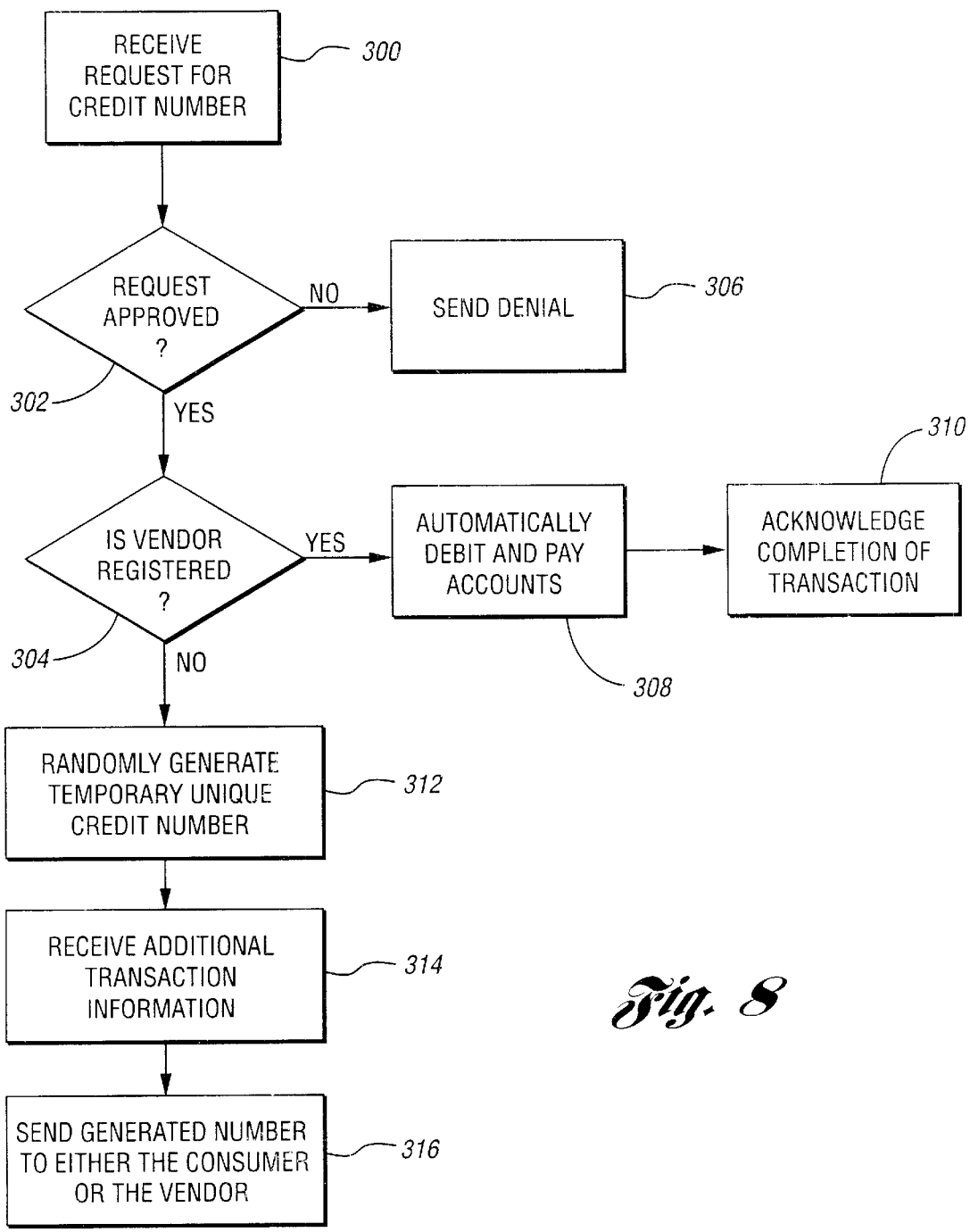

METHOD AND SYSTEM FOR PROVIDING TEMPORARY CREDIT AUTHORIZATIONS

TECHNICAL FIELD

The present invention generally relates to consumer credit arrangements used when purchasing goods or services, and more particularly to a method and system for issuing credit that minimizes potential credit card fraud or theft when consumers are purchasing goods or services.

BACKGROUND ART

Electronic commerce is a rapidly growing way of conducting business. This growth is further fueled by use of the Internet. Notwithstanding this growth in electronic commerce, products and services are still purchased in person at established retail locations. Most people pay for these endeavors by using an assortment of credit cards, cash, and checks. Currently, the best commerce tool available for bridging the gap between on-line and off-line worlds of commerce is a credit card. Credit cards allow the same payment mechanism in both worlds, primarily because they offer fast and remote authorization. However, credit cards also suffer the drawbacks of providing a lack of anonymity, fraud potential (especially on-line), and expensive fees.

One solution is to use so-called "smart cards" which are designed to be just as flexible and safe as cash, yet offer the electronic benefits of credit and debit cards. Though achieving some success in Europe, the use of such smart cards has not been generally accepted in the US, partly due to the public's reluctance to give up their loyalty and incentive credit card programs while finding room for another card in their already crowded pocketbook. Vendors and banks balk at the high cost of creating the infrastructure to support smart card applications. Furthermore, since traditional credit cards are the current method of electronic commerce, use of smart cards would reduce the overall cost of central transaction authentication, which otherwise forms a significant profit source for traditional credit card issuers.

Credit card companies currently have centrality in the burgeoning hybrid electronic/off-line commerce world, and the fees they collect from merchants for transactions and from consumers in debt financing are substantial. However, the customer no longer seeks prestige with traditional credit cards, but rather convenience, safety, and worthwhile incentives among their infinite choices in the competitive marketplace. Therefore a need exists for an alternative manner of conducting payment in commercial transactions which is as convenient as a credit card, but safer and more cost effective.

DISCLOSURE OF INVENTION

It is therefore an object of the present invention to provide a system and method for issuing credit in a consumer transaction which eliminates the need for the consumer to carry a credit card.

It is another object of the present invention to provide a system and method for issuing credit in a consumer transaction which minimizes the potential for theft or fraudulent use of the credit.

It is yet another object of the present invention to provide a system and method for issuing credit in a consumer transaction which maximizes convenience to the consumer without requiring a credit card.

It is still another object of the present invention to provide a system and method for issuing credit in a consumer transaction which minimizes the potential for theft or fraudulent use of the credit by generating temporary, single transaction credit card numbers.

It is yet another object of the present invention to provide a system and method for issuing credit in a consumer transaction which utilizes a mobile phone or a personal computer (PC) as a way of generating credit card numbers that are valid for only a single transaction.

In accordance with these and other objects, the present invention provides a method for issuing credit as payment in a consumer transaction between a consumer and a vendor that includes initially making a request for issuance of a credit transaction number concurrent with the consumer transaction, where the request includes information regarding the transaction amount, and identification of the customer and vendor. In response to the request, a unique credit transaction number is randomly generated if the request is acceptable, where the unique transaction number is only valid for a predetermined period of time and for the requested transaction. The generated credit transaction number is then sent either to the requesting consumer, or the identified vendor to allow completion of the transaction.

In accordance with another aspect of the present invention, a system is provided for issuing credit as payment in a consumer transaction involving a consumer and a vendor that includes a transaction processing subsystem located at a service provider, and a consumer credit request input device capable of communicating with the transaction processing subsystem. The input device is arranged to generate a request for issuance of a credit transaction number concurrent with the consumer transaction, and send the request to the transaction processing subsystem. The transaction processing subsystem is arranged to randomly generate a unique credit transaction number if the request is acceptable, where the unique transaction number is valid only for a predetermined period of time and for the requested transaction.

In accordance with other features, the request is made using a mobile communication device such as PCs telephone, or a personal computer. The generated number can be sent either to the requesting device for manual input into a vendor credit verification system, or directly to the vendor.

In accordance with still another aspect of the present invention, a method is provided for automatic processing and payment of a transaction between a customer and a vendor which includes the steps of establishing a centralized service provider through which electronic commerce may flow, and the centralized service provider is arranged to identify both the customer and the vendor of the transaction. A purchase request is received from the customer at the centralized service provider; and a determination of acceptability of the transaction is made. If acceptable, a customer account established with the centralized service provider is automatically debited, and the vendor is automatically paid.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 8 is a flow chart illustrating the overall process for issuing a temporary credit transaction number in accordance with the present invention.

BEST MODE FOR CARRYING OUT THE INVENTION

Figure 1:
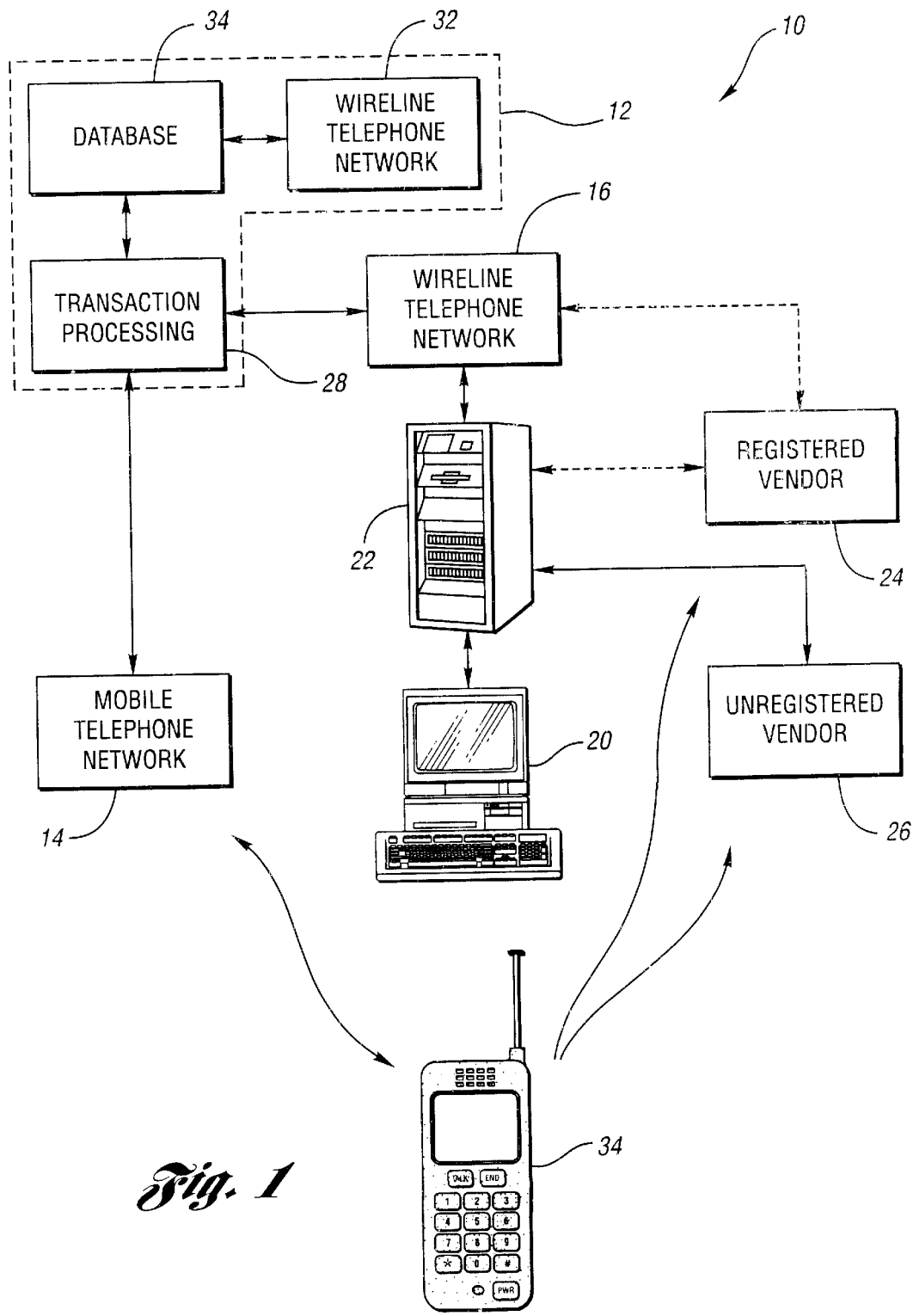
FIG. 1 is a block diagram of a credit management/issuance system in accordance with an exemplary embodiment of the present invention.

FIG. 1 provides a block diagram for a credit management/issuance system 10 in accordance with an exemplary embodiment of the present invention. The basic components of system 10 include a service provider 12 connected to a cellular and/or PCS mobile telephone network 14, and a wireline telephone network 16. As described in more detail below, mobile telephone network 14 is used to provide communication with at least one wireless customer 18, while wireline network 16 is used to facilitate communication with PC customer(s) 20 such as via an Internet server 22, as well as registered businesses 24 and non-registered businesses 26. Service provider 12 includes a suitable administrative and transaction processing subsystem 28, accounting subsystem 30, and system database 32.

When a customer wishes to purchase from a unregistered vendor an item traditionally handled using a credit card, a request is sent to the service provider for issuance of a credit transaction number. Processing subsystem 28 is configured with suitable hardware and programming to randomly generate unique, temporary credit transaction numbers that are valid only for a single purchase transaction and a very short period of time. The temporary credit number takes the place of a permanently assigned number issued in connection with a traditional credit card. In response to receipt of the request, administrative and processing subsystem 28 accesses database 32 to determine credit status of the requesting customer, and generates a unique, temporary credit transaction number valid only for the requested transaction and transaction amount. In other words, for each transaction, a new number is given which is authorized only for a specific date and time, for a specific amount, and from a unique personal ID. The unique ID can be derived from either a secure log-on session ID or a PCS/cellular telephone unique ID number.

The customer account in database 32 is subsequently updated to note the transaction information as well as the number assigned. To the unregistered business/vendor, the assigned temporary "credit card" number is simply processed and validated using the same traditional channels as conventional credit card providers. In this manner, the present invention is able to dramatically reduce the potential for fraud because even if a temporarily assigned number were stolen, the number is only valid or useable with a specifically identified transaction and for a very limited period of time.

In further accordance with the present invention, overall service is improved by allowing businesses to register (as represented by businesses 24 in FIG. 1) for receipt of vendor or individual IDs. When a customer wants to purchase products and services from a business which has registered, the service provider acts as a centralized broker for the transaction because it would already possess the requisite personal information for both the customer and the registered vendor. Thus, once the specific transaction information is received, there is no need for the service provider to actually generate a temporary credit transaction number as described above because the appropriate accounts can be automatically debited/paid without further action by either the customer or vendor. More specifically, registration allows the service provider to store appropriate payment, address, and shipping information in a business/vendor file as well as the customer database. The customer can be automatically billed for example through a telephone account, while the vendor can be paid electronically for the transaction.

In accordance with one embodiment of the present invention, the temporary credit transaction number is requested using a PCS or cellular telephone unit 34. In this embodiment, the temporary transaction number can be generated, assigned, and sent back to the requesting mobile telephone unit for storage in a memory. Alternatively the credit transaction number can be sent directly to the identified business for processing like a conventional credit card. Thus, the present invention advantageously eliminates the need for a traditional plastic credit card by adapting a mobile telephone unit to function as a "smart" card based on transferred data specific to the transaction at hand.

Figure 2:
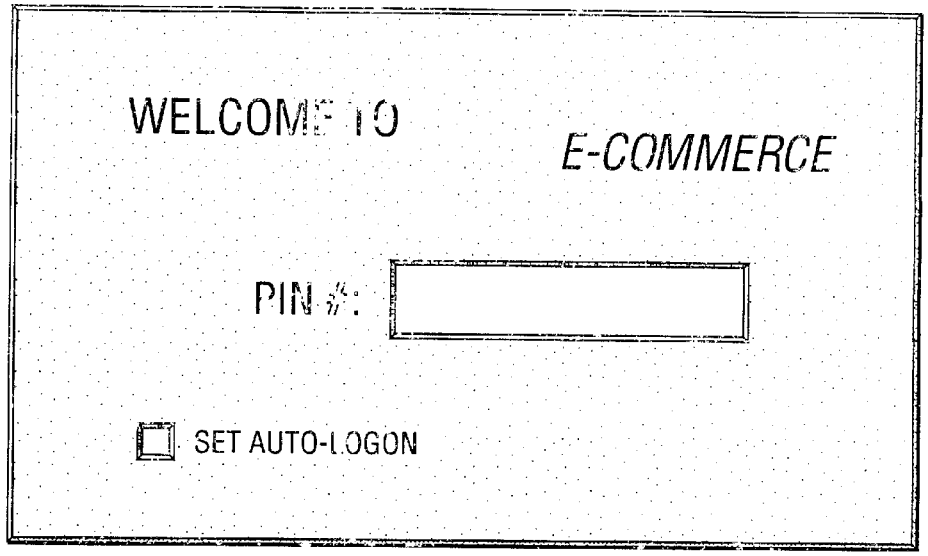
FIG. 2 is a representation of an initial P.C. screen on-line embodiment of the present invention which allows a customer to restrict access to the credit issuance application.
Figure 3:
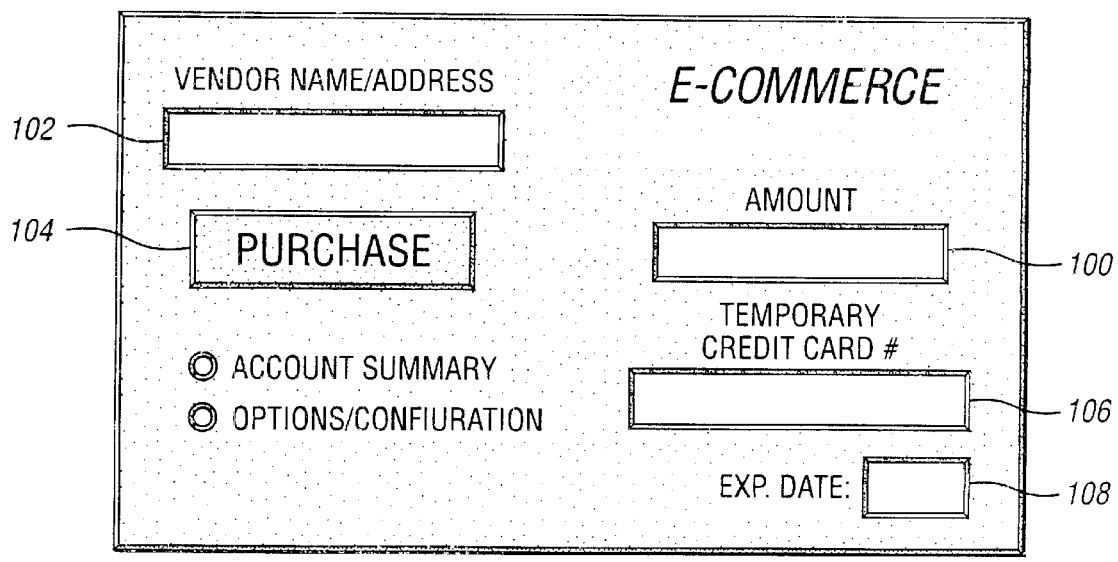
FIG. 3 is a representation of a screen presentation which is used to initiate the credit issuance process of the present invention.

In an on-line embodiment of the present invention, the user launches an E-commerce credit request program from their PC 20. FIGS. 2 through 5 illustrate examples of PC screens provided by the program. More specifically, FIG. 2 is a representation of an initial PC screen which requires input of a PIN number to restrict access to launching the credit issuance application. FIG. 3 is a representation of a screen used to initiate the credit issuance process of the present invention.

As shown, the customer enters a purchase amount in a field 100, and a vendor name/address if the vendor is not registered in a field 102. The purchaser then launches the request using a purchase request field 104. If the request is approved, processing subsystem 28 responds by sending the temporary credit transaction number assigned to this transaction which is displayed in a field 106. A mock or faux expiration date for the temporary credit transaction number is also displayed in a field 108 to allow completion of the transaction. This faux expiration date is not to be confused with the period of authorization for the generated credit transaction number, which is set to a short period of time, such as one minute. At the end of this period, the temporary number is no longer valid. The actual look and feel of this screen could be altered as needed for use with any information appliance such as PDA, PCS, or screen phone.

Figure 4:
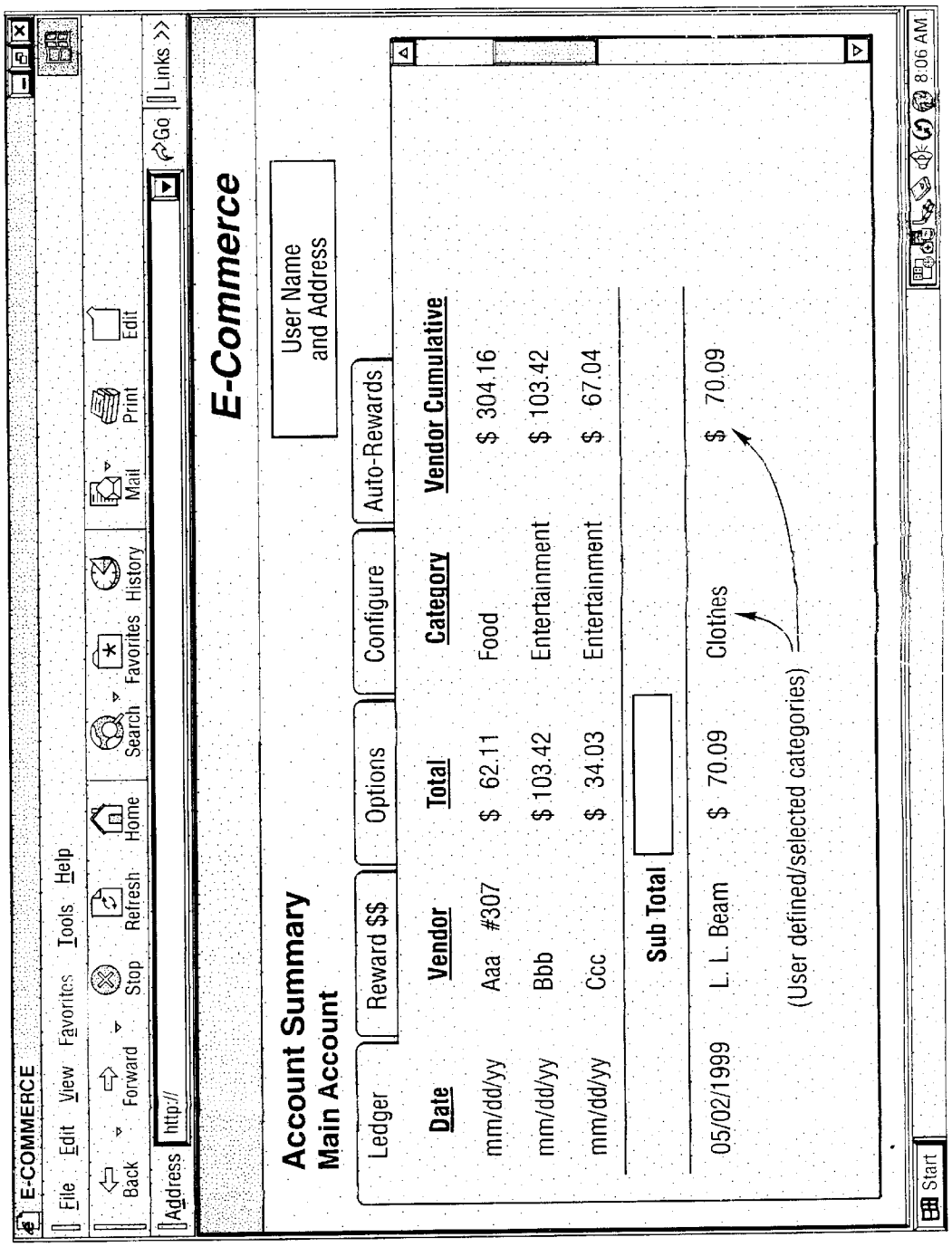
FIG. 4 is a representation of an account summary screen where customers can view and manage their purchases.

FIG. 4 is a representation of an account summary screen where customers can view and manage their purchases. As shown, the account summary is presented in a spread sheet format and provides cumulative transaction and account balance information, as well as itemized details regarding each transaction. In addition, the screen is preferably customizable to allow the user to sort transactions by category, month, or other available options. The application program is also preferably arranged to format the account information for import into a separate accounting/book keeping program loaded on the customer's PC.

Figure 5:
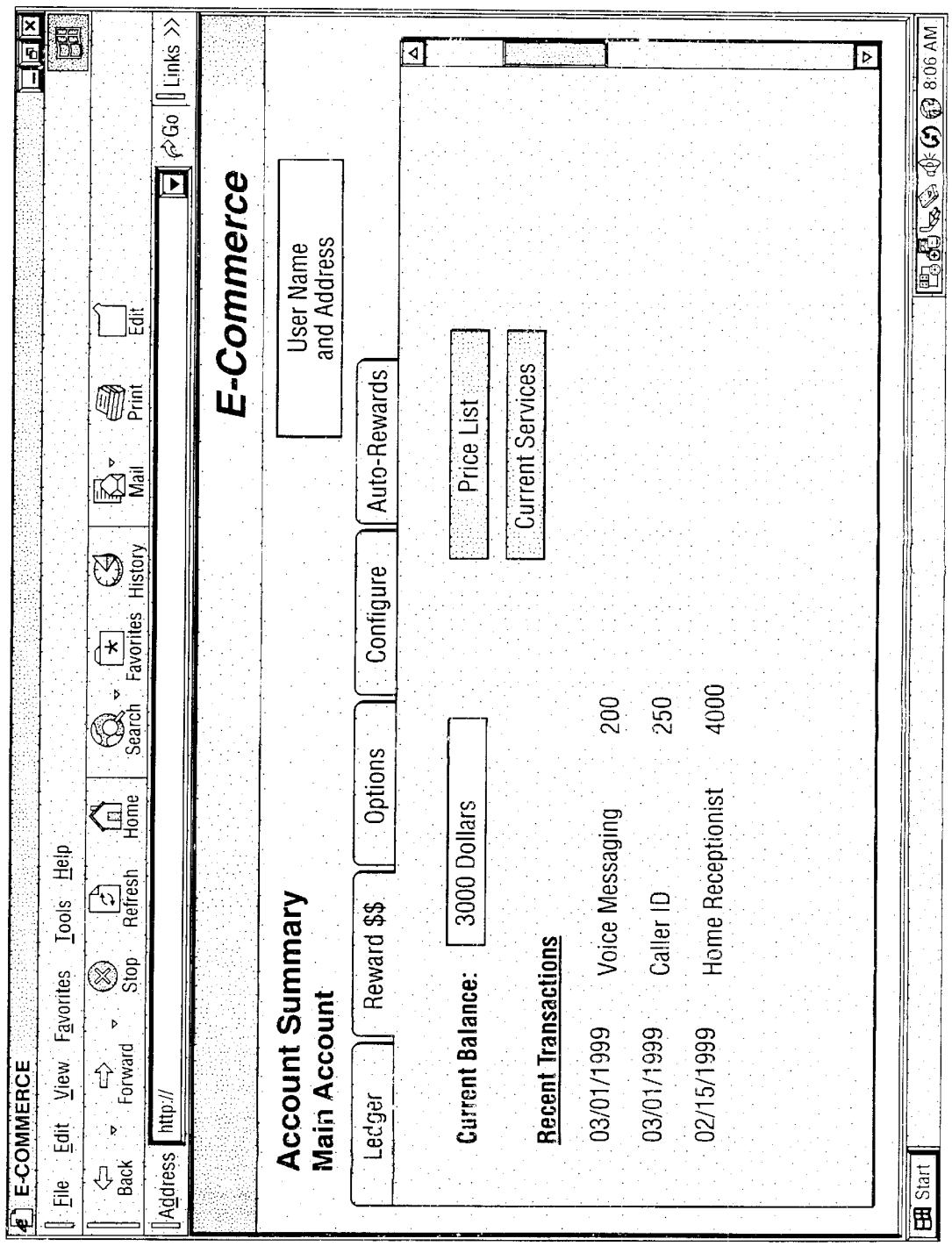
FIG. 5 is a representation of a summary and transaction list for an incentive reward program of the present invention.
Figure 6:
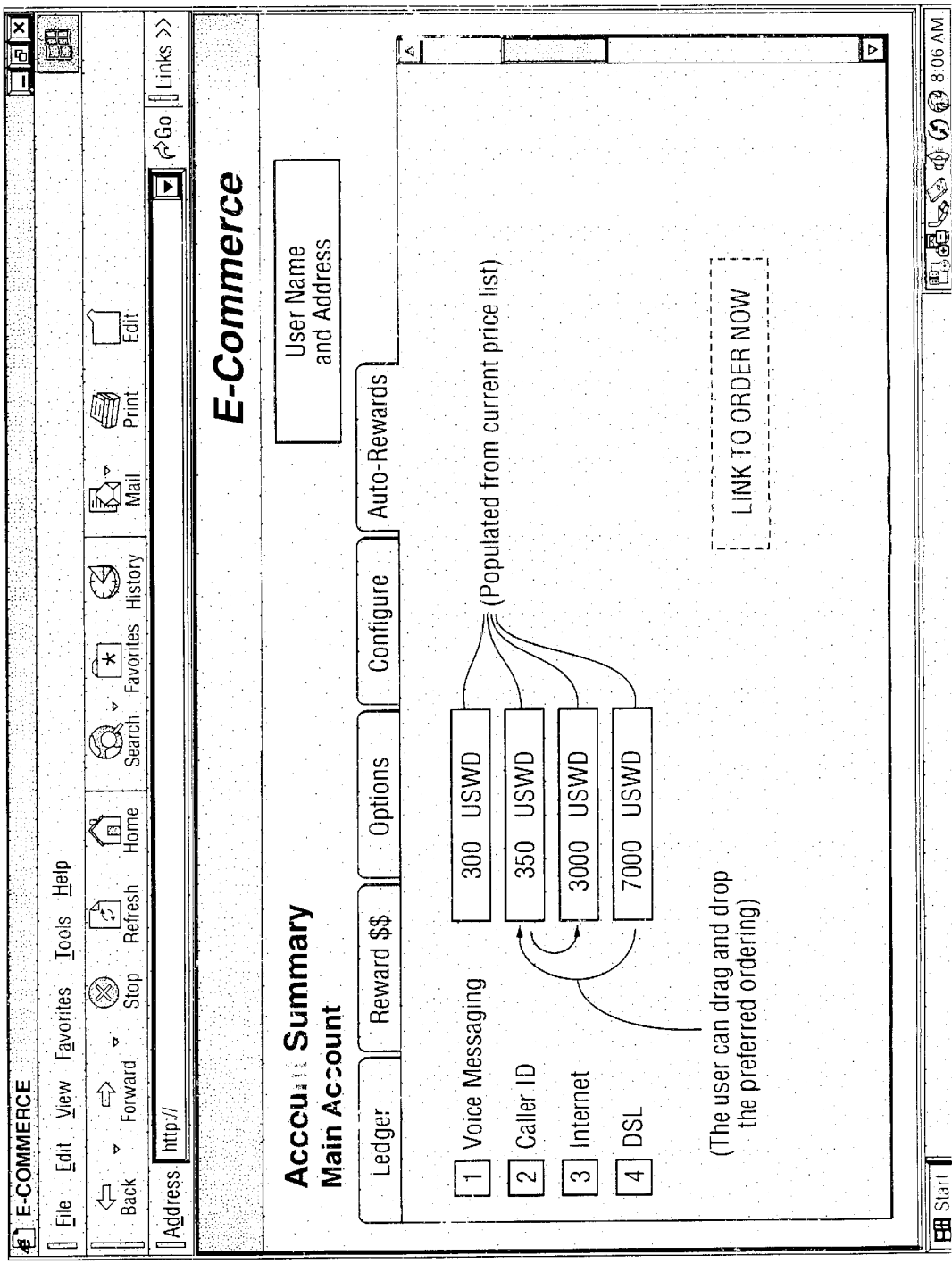
FIG. 6 is a management console for the incentive program of FIG. 5.

In accordance with another aspect of the present invention, an award incentive program can be included and managed using screens as represented in FIGS. 5 and 6. More specifically, for each dollar spent using the credit issuance process of the present invention, a customer can be rewarded with phantom dollars which can be used to purchase other goods or services offered by the service provider.

Figure 7:
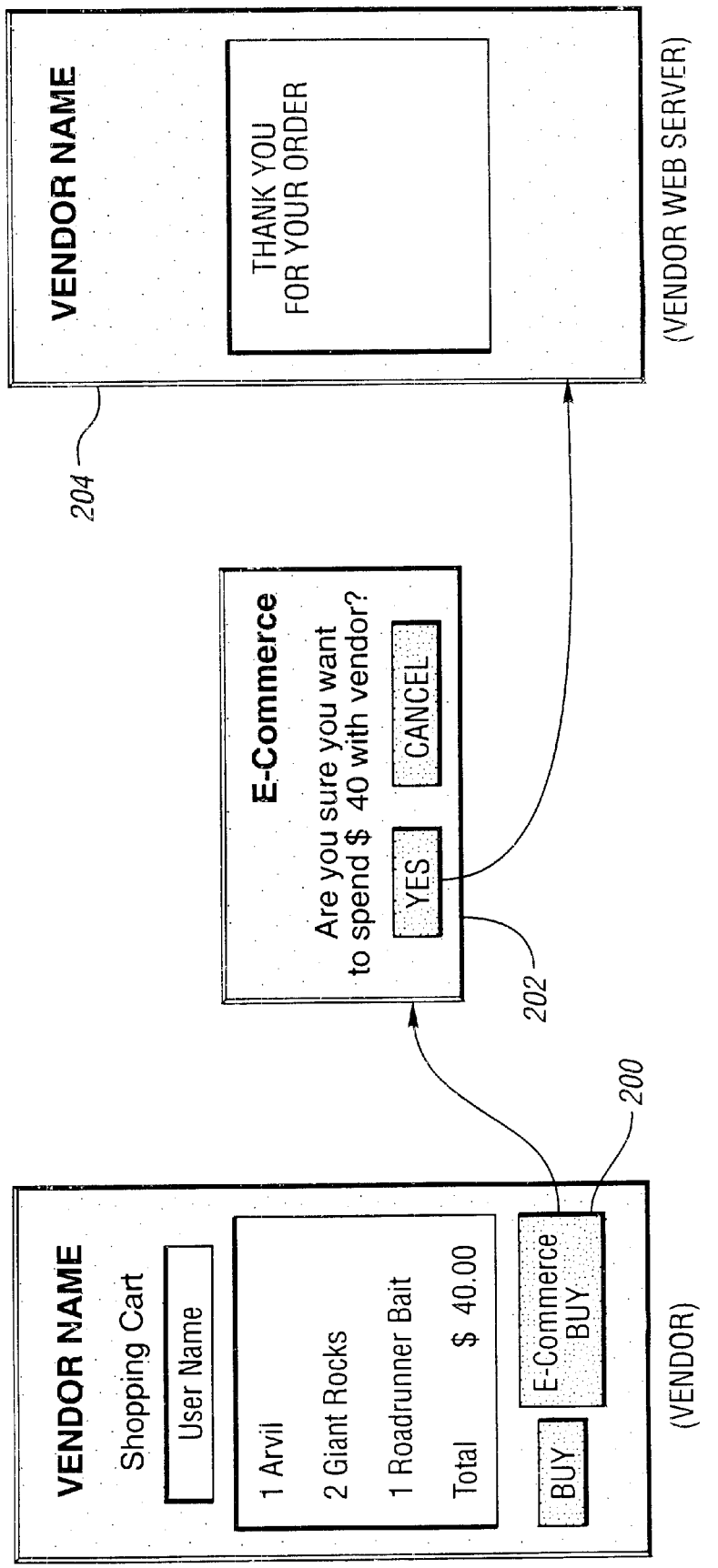
FIG. 7 is a story board illustrating an on-line purchase transaction between a customer and a registered vendor.

Several scenarios are described below to provide a better understanding of the various aspects and advantages of the present invention. In a first scenario represented in FIG. 7, a customer decides to purchase certain goods in an on-line electronic commerce transaction. If the vendor is registered with a vendor ID, a direct link 200 can be provided to the service provider such that the customer only has to agree to the purchase and the service provider will automatically debit and credit the customer and vendor accounts accordingly. An alternative embodiment could still have the service provide create a temporary credit transaction number and automatically send it through to a registered vendor's normal credit authentication system. However, the direct link and automatically processing arrangement is preferred because of improved security, lower system cost, and faster processing turn around. Verification of the purchase request and acknowledgment of processing completion are noted respectively at blocks 202 and 204. Also, other relevant information can be transmitted to the vendor such as customer shipping and address information. The charge could then be billed separately to the customer such as part of their phone bill, and the vendor would be credited in the same manner as any other credit card purchase. Thus, the present invention eliminates both the potential for credit card fraud, and the need for a customer to repeat entry of shipping and address information.

One way of providing a direct link from a registered vendor is to embed an HTML information link to the service provider from inside a vendor's web page. A vendor who chooses to provide this direct link would by default also choose to be a registered vendor. This process of registering would consist of setting up a method of recording valid transactions with any given vendor to determine the information needed by the vendor to receive payment and ship the product, as well as providing the vendor with a unique link to embed in their pages that would notify the customer of the vendor's unique Vendor ID.

Thus, while the E-commerce program can be arranged to work in conjunction with a registered vendor as described above, a preferred embodiment of the present invention carries out the credit transaction process directly with registered vendors. The randomly generated or unique credit transaction number would be sent to the customer only if the vendor is not registered . For example, any current web site which accepts credit card payments would fall into this category.

For such an unregistered vendor, the customer would access the Ecommerce program as described above. After entering the purchase price, the temporary credit transaction number is generated for that particular transaction and is authorized only for that session ID, at that date and time (i.e., a limited time interval thereafter), and for the specific amount of the purchase. Since the credit transaction number is temporary, the numbers are continuously recycled by the service provider irrespective of the assigned customer.

For example, a customer purchases books from an unregistered vendor. The transaction proceeds by selecting the books and ringing them up at a point-of-sale or checkout. When the vendor asks for the customer's credit card information, the customer merely enters the total purchase price into the electronic commerce applet, and a temporary credit transaction number is generated by the service provider which can be pasted to the vendor's form. The customer would still have to send other information such as a shipping address, but the credit card number would be fraud proof because authorization extends only to the transaction amount of the transaction occurring at that specific date and time, and by that particular customer. In other words, the service provider would have already authenticated the customer such as through receipt of a unique session ID assigned. Such a unique session ID is either automatically generated at the time of log-on to the Internet, or via a specific request if the Internet connection is a public or continual type connection. Thus, the temporary credit number could not be subsequently used by anybody else for fraudulent purchases. The vendor simply process the number through a conventional verification system like any other credit card number for appropriate authorization.

In a second scenario, a PCS telephone allows a similar arrangement for off-line commerce. More specifically, a customer walks into a retail location. After selecting the desired goods, the customer goes to a checkout counter and receives a total. Using a PCS phone as a smart card, the customer can dial a vendor ID number on the phone, identify and key-in a checkout line or point-of-sale designator, actuate a pound key, verify the purchase amount, and the clerk would receive authorization . If the particular vendor is not a registered vendor, the credit transaction number would be returned to the PCS phone, which could be used at any vendor who normally accepts credit cards. Again the temporary credit transaction number would have the same safeguards as noted above, i.e., is valid only for the transaction amount at the specified date and time, and from the requesting mobile telephone.

More specifically, in one embodiment involving an unregistered vendor, the customer could verbally give the temporarily assigned credit card information to a point-of-sale clerk. This information would appear on a customer's information device and provide a generated number as previously discussed. Alternatively, a suitable proximity device could be incorporated into the mobile telephone device to allow the mobile telephone to generate an output signal corresponding to the temporary credit transaction number which could be received by a receiving device connected to the point-of-sale system. The transmission of the output signal could be controlled via a user actuated key.

In an alternative embodiment involving registered vendors, the service provider would automatically process the transaction and debit and credit the appropriate accounts. Alternatively, the service provider could electronically send the temporary credit transaction number or similar transaction information directly to a vendor cash register system to cause registering of the transaction. For example, after a customer enters a registered supermarket and obtains the desired items, the customer can either dial an ID code assigned to the store into the customer's PCS device, or pre-store the store code into memory for "speed dialing." The customer further dials a number identifying the point-of-sale or check-out terminal, and then sends the call for transaction initiation. The service provider responds by sending the authorization and temporarily assigned credit transaction number to the point-of-sale terminal via a secure Internet or other on-line connection to complete the purchase transaction.

It is to be understood that other communication devices could be used in the same manner as a PCS telephone. For example, the request could come from a landline phone, palm PC type device, Web phone, or screen phone.

However, the device preferably includes a display for visual display of information so as to keep transaction verification simple. A landline ID could be determined if a customer were calling from their own phone or business phone based on the same technology used for Caller ID. For landline access from pay-phones or various extensions in a home or business in which many people have access, a user PIN number would need to be previously assigned.

Referring now to FIG. 8, a flow chart shows the overall process for issuing a temporary credit transaction number in accordance with the present invention. More specifically, at block 300 a request is received for generating a temporary credit transaction number. The request includes information regarding the transaction, such as purchase amount, date and time of purchase, customer identification, and vendor identification. As indicated at block 302, if the request is approved, the process determines if the identified vendor is registered as indicated at block 304. If the request was not approved, a denial message is sent at block 306. As indicated at block 308, if the vendor is registered, the service provider automatically processes the transaction and debits and pays the appropriate accounts. An acknowledgment is sent at block 310 to confirm completion of the transaction.

However, if the vendor is not registered, a unique, temporary credit transaction number is randomly generated at block 312. The temporary credit transaction number is only validated for a limited period of time and for the requested transaction. The process also looks for input of additional information such a mailing address at block 314. Then, the generated credit transaction number is sent at block 316 to either the requesting customer, or the vendor for verification and finalization of the transaction.

It is to be further noted that the credit authorization/ payment and commerce arrangement for registered vendors can be readily applied to other paradigms where a particular entity has a position of centrality through which electronic commerce may flow, while also being able to identify the respective end points (i.e., buyer and seller) of the transaction. An satellite system program provider provides one example of such a centralized entity. More specifically, the system permits a customer to order pay-per-view programming using a remote control, with such selections appearing on a periodic billing statement. In such a situation, a satellite customer could watch a shopping channel, and select items for purchase using the remote control. The programming provider can then broker the transaction by automatically processing the purchase request, and debit and pay the respective customer and shopping channel accordingly. The goods could then be shipped to the customer with the charge appearing on the periodic monthly statement.

Because the programming provider can identify both the customer and the vendor, the transaction can be brokered between the two parties without the use of a traditional credit card.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for issuing credit as payment in a consumer transacton comprising:

requesting issuance of a credit transaction number over the internet or by telephone concurrent with the consumer transaction, the request comprising supplying information regarding the transaction amount, and identification of the customer and vendor;

determining if the request is acceptable;

randomly generating a unique credit transaction number if the request is acceptable, the unique transaction number being valid only for a predetermined period of time and for the requested transaction; and sending the generated unique credit transaction number for completion of the consumer transaction.

2. The method of claim 1 wherein the generated unique credit transaction number is sent to the customer.

3. The method of claim 1 wherein the generated unique credit transaction number is sent to the vendor.

4. The method of claim 1 further comprising determining that the identified vendor is registered, automatically debiting a customer account and making payment to the vendor without generating a unique credit transaction number.

5. The method of claim 1 wherein requesting the credit transaction number is performed using a mobile communication device.

6. The method of claim 1 wherein requesting the credit transaction number is pe rformed using a PCS telephone.

7. The method of claim 6 wherein the unique credit transaction number is sent to the PCS telephone for display, and the vendor manually enters the displayed number into a credit verification system for approval.

8. The method of claim 6 wherein the unique credit transaction number is sent to the PCS telephone, and the PCS telephone is used as an input device for entering the generated unique credit transaction number into a vendor credit verification system for approval.

9. The method of claim 1 wherein requesting the credit transaction number is performed using a personal computer.

10. A system for issuing credit as payment in a consumer transaction involving a consumer and a vendor comprising:

a transaction processing subsystem located at a service provider; and a consumer credit request input device capable of communicating with the transaction processing subsystem, the input device arranged to generate a request for issuance of a credit transaction number concurrent with the consumer transaction, the request including an identification of the customer and the vendor, and sending the request over the internet or by telephone to the transaction processing subsystem, wherein the transaction processing subsystem is arranged to randomly generate a unique credit transaction number if the request is acceptable, said unique transaction number being valid only for a predetermined period of time and for the requested transaction.

11. The system of claim 10 wherein the transaction processing subsystem is arranged to send the generated unique credit transaction number to the consumer credit request input device.

12. The system of claim 10 wherein the transaction processing subsystem is arranged to send the generated unique credit transaction number to the vendor.

13. The system of claim 10 wherein the transaction processing subsystem is arranged to determine that the vendor is registered, and automatically debit a customer account and pay the vendor without generating a unique credit transaction number.

14. The system of claim 10 wherein the credit request input device comprises a mobile communication device.

15. The system of claim 10 wherein the credit request input device comprises a PCS telephone.

16. The system of claim 15 wherein the PCS telephone comprises a display, and the unique credit transaction number is sent to the PCS telephone for output on the display, wherein the vendor manually enters the displayed number into a credit verification system for approval.

17. The system of claim 15 wherein the transaction processing subsystem is arranged to send the generated unique credit transaction number to the PCS telephone, and the PCS telephone comprises a proximity output device for entering the received number into a vendor credit verification system for approval.

18. The system of claim 10 method of claim 1 wherein the credit request input device comprises a personal computer.

19. A method for automatic processing and payment of a transaction between a customer and a vendor comprising:

establishing a centralized service provider through which electronic commnerce may flow, said centralized service provider being able to identify both the customer and the vendor of the transaction;

receiving a purchase request from the customer at the centralized service provider over the internet or by telephone requesting issuance of a temporary randomly generated unique credit transaction number concurrent with the consumer transaction, the transaction number being valid only for a predetermined period of time and for the transaction, the request comprising supplying information regarding the transaction amount, and identification of the customer and the vendor;

determining if the request is acceptable; and automatically debiting a customer account established with the centralized service provider, and paying the vendor.

* * * * *